United States Patent [19]

Kawabata et al.

[11] 4,374,509
[45] Feb. 22, 1983

[54] FIXTURE DEVICE FOR A DISTRIBUTOR

[75] Inventors: Takakazu Kawabata; Seigo Hino, both of Toyota, Japan

[73] Assignees: Toyota Jidosha Kogyo Kabushiki Kaisha; Nippon Denso Company Limited, both of Kariya, Japan

[21] Appl. No.: 147,619

[22] Filed: May 7, 1980

[30] Foreign Application Priority Data

Jun. 23, 1979 [JP] Japan ............................ 54-86181[U]

[51] Int. Cl.³ .............................................. F02P 5/04
[52] U.S. Cl. .............................. 123/146.5 A; 70/232; 292/151; 292/307 B
[58] Field of Search .............. 70/232; 292/151, 307 B, 292/307 R, 317; 123/146.5 A

[56] References Cited

U.S. PATENT DOCUMENTS

| 1,122,872 | 12/1914 | Dinsmoor | 292/307 R |
| 1,397,917 | 11/1921 | Behrman | 292/307 R |
| 1,887,557 | 11/1932 | Keidel | 292/307 B |
| 2,033,371 | 3/1936 | Benaggio | 292/327 |
| 2,688,055 | 8/1954 | Schneider | 123/146.5 A |
| 3,736,017 | 5/1973 | Kaiho | 292/317 |
| 4,242,290 | 12/1980 | Handelsman | 292/251 |

FOREIGN PATENT DOCUMENTS 612381 11/1948 United Kingdom .

Primary Examiner—Ronald B. Cox
Attorney, Agent, or Firm—Oblon, Fisher, Spivak, McClelland & Maier

[57] ABSTRACT

A fixing device used for a distributor which includes a cylindrical portion, through which a driving shaft is pierced, and a flange for fastening the distributor to the engine with a bolt. The fixing device consists mainly of a pair of container-like covers to be faced to each other with an opening portion thereof for being fitted, one into the other, to untouchably cover the head of the fastening bolt. Both are provided with a bottom plate and a side wall and one of the covers is further provided with a through-hole in the center of the bottom plate for being pierced by the fastening bolt. Both covers are further given necessary dimension to be mutually fitted, one into the other, and accommodate the head of the bolt in the enveloped space between the both covers. Either one cover is provided with engaging tongues for engaging with engaging portion(s) formed in the side wall of the other cover. A rigid combination of both covers made in this way into an integral body can not be released easily by users, with a result of preventing an easy re-adjustment of the phase relation in the distributor. This difficulty of releasing the combination of the covers is the purpose of this invention.

15 Claims, 17 Drawing Figures

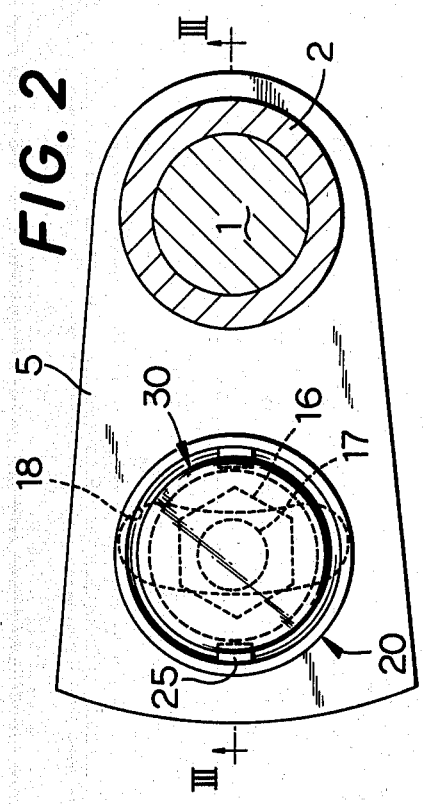
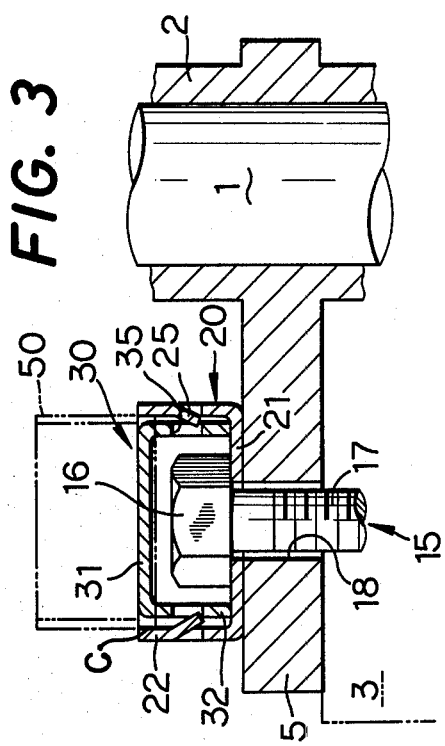
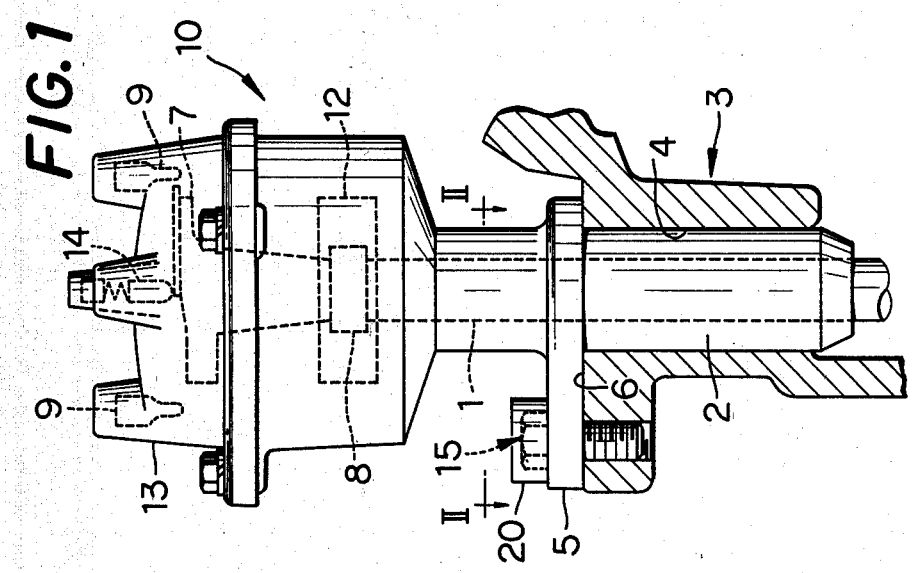

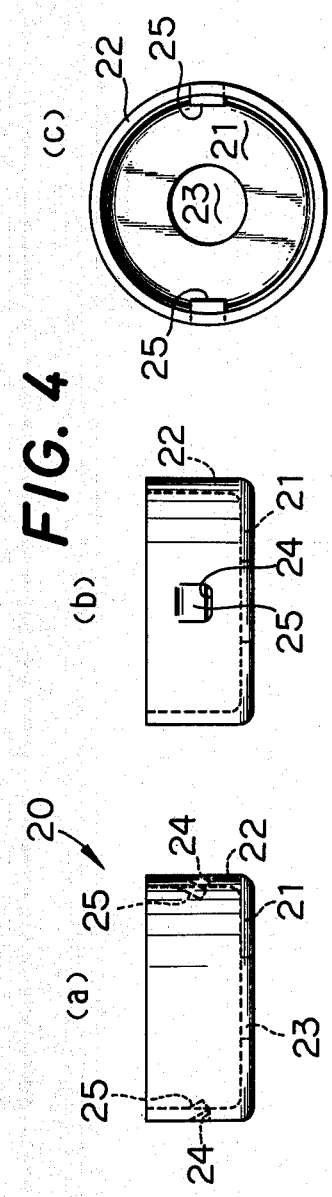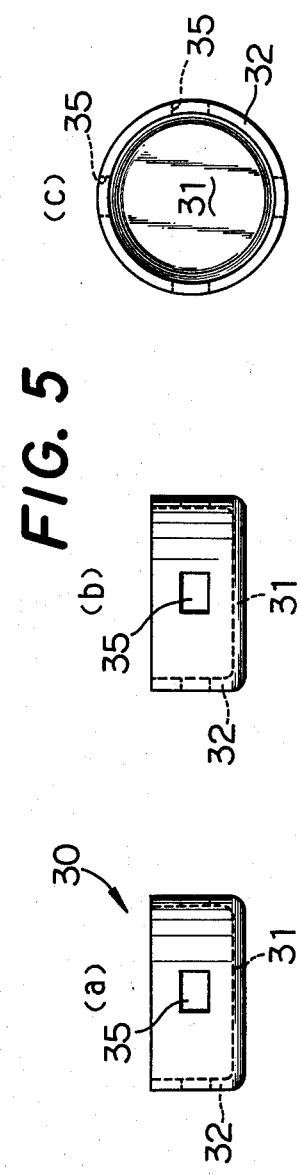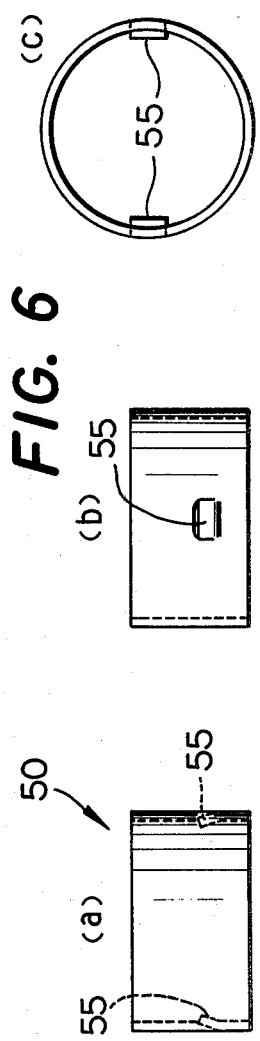

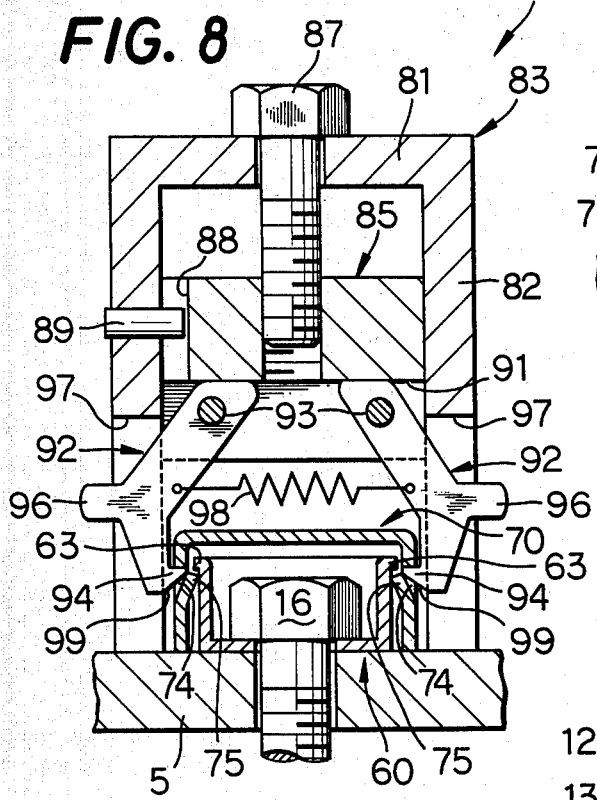
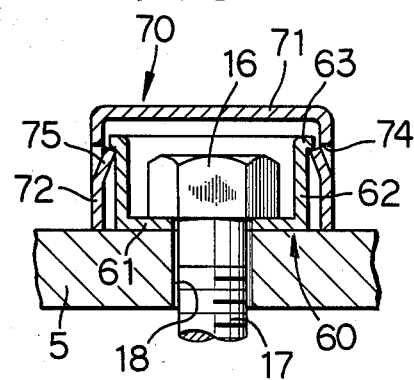
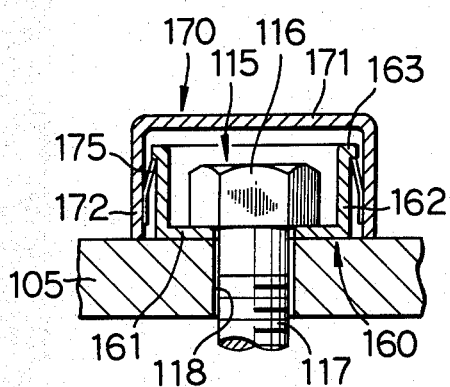
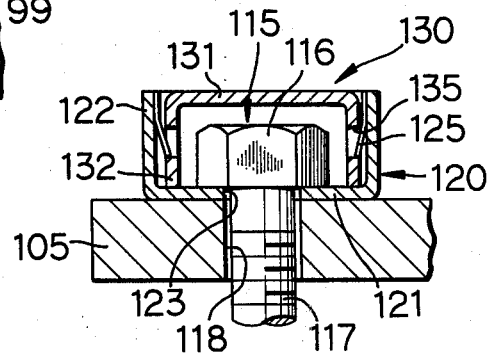
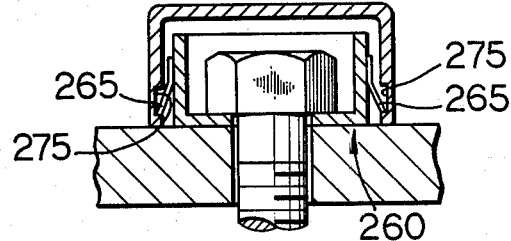

FIXTURE DEVICE FOR A DISTRIBUTOR

BACKGROUND OF THE INVENTION

1. Field of the Invention

This invention relates to a fixing device for a distributor for supplying ignition voltage to an engine, and more particularly to a fixing device provided with a means which does not allow the distributor, after having once been position settled by the adjustment of the ignition timing, to be easily changed in position.

2. Description of the Prior Art

A distributor is originally an apparatus, which includes a rotor and ignition signal generating means consisting of a pick-up, a chopper, etc., for generating ignition signal in response to rotation of the rotor, for supplying ignition signal to each of the plugs at a best timing. For that purpose the rotor is usually rotated by a driving shaft or the like synchronously with the rotation of the engine, and the timing of ignition is therefore determined by means of adjusting the phase of the ignition signal generating means against the rotor.

As a concrete way of adjusting the phase of the ignition signal generating means against the rotor it has been recognized to be practicable to make the whole of a distributor casing rotate in relation to the rotor. For that reason it has been traditionally executed to rotatably fit a cylindrical portion of the distributor casing, through which the rotor is pierced, into a fitting hole formed in a part of the engine, to form an elongated hole in a flange extended laterally from the cylindrical portion, and to rotate the casing about the cylindrical portion as far as the ignition timing may be adjusted, before a bolt pierced through the elongated hole is screwed up so that the casing may be fixed at a best suitable phase.

This determination or adjustment of the ignition timing is executed on full consideration of driving efficiency of the engine as well as diminishing of concentration of the harmful or toxic gas contained in the exhaust gas from the engine, so it requires fairly large scale equipment therefor and high technical skill. It is therefore highly desirable that the once settled position of the distributor will not be changed easily or unexpectedly.

A most suitable ignition timing only from the view point of driving efficiency of the engine is not necessarily equal to or agreeable with a most suitable ignition timing viewed from the driving efficiency of the engine and the diminishing of concentration of the toxic gas in the exhaust gas in parallel. In a case wherein the driving efficiency of the engine can be enhanced at the sacrifice of increasing the concentration of the toxic gas, it can happen that users of cars intentionally change the phase of the distributor. In some countries car makers are therefore restricted or regulated to take a necessary measure by laws not to allow the users to easily change the phase of the distributor.

SUMMARY OF THE INVENTION

This invention was made from such a background for providing, as a primary object thereof, a fixing device for a distributor so as to fix the distributor in such a manner as not to allow an easy change of the position after it has once been settled. Another object of this invention is to provide a fixing device for a distributor which includes a special cover of a bolt head which can be removed easily with a special tool made exclusively for that purpose, but can hardly be removed without that tool. Still another object of this invention is to provide the device mentioned above, which is attainable the enumerated objects, with a structure as simple as possible and at a cost as low as possible.

The device in accordance with this invention has an undermentioned structure, being provided with a pair of container-or box like member having a side wall and a bottom plate, a first container-like member and second container-like member, both members being placed face to face to each other with an opening portion thereof respectively. Either one of the first and second container-like members is so made as to be fitted into the other; and the dimension of both members are determined such that a head of a bolt for fixing a flange of the distributor to the engine can be accommodated in one container-like member which is fitted into the other. The first container-like member is provided with, in the side wall, at least two engaging tongues which are elastic and directed at its tip portion to the bottom plate thereof; and the second container-like member is provided with, in the side wall, at least one engaging portion which is engageable with the engaging tongues, when the first container-like member having the engaging tongues is fitted into or onto the second container-like member, for preventing removal of one container-like member from the other. In the bottom plate of either one of the container-like members a through hole through which the bolt is pierced is formed. And through the through hole and an elongated hole formed in a flange of the distributor the bolt is pierced for screwing either one of the container-like members and the flange to the engine. Afterwards the other container-like member is fitted in or on the one container-like member which has been fixed with the bolt, so that the head of the bolt can be covered not to be touched from outside.

BRIEF DESCRIPTION OF THE DRAWINGS

FIG. 1 is an elevational view, partially broken away, of a distributor containing an embodiment of a fixing device in accordance with this invention;

FIG. 2 is a cross sectional view taken along the section line of II—II in FIG. 1;

FIG. 3 is an axial sectional view taken along the section line of III—III in FIG. 2;

FIGS. 4 (a)-(c) are respectively an elevation, a profile, and a plan of a first container-like member, or a cover to be fixed, used in the embodiment shown in FIGS. 1-3.

FIGS. 5 (a)-(c) are respectively an elevation, a profile, and a plan of a second container-like member, or a cover to be attached to the first container-like member, used in the same embodiment as the above;

FIGS. 6 (a)-(c) are respectively an elevation, a profile, and a plan of a removing tool for the second container-like member;

FIG. 7 is an axial sectional view, showing only an essential part, of another embodiment of a fixing device of this invention;

FIG. 8 is an axial sectional view, in elevation, of a removing device for a second container-like member used in the embodiment shown in FIG. 7;

FIG. 9 is an axial sectional view, showing only an essential part, of another embodiment of this invention;

FIG. 10 is an axial sectional view, showing only an essential part, of still another embodiment of this invention;

FIG. 11 is an axial sectional view, showing only an essential part, of still another embodiment of this invention.

DETAILED DESCRIPTION OF THE PREFERRED EMBODIMENTS

With reference to the appended drawings detailed description of the preferred embodiments will be made hereunder.

A distributor 10 shown in FIG. 1 includes a driving shaft 1, on which a distributor rotor arm 7 (hereinafter called a rotor arm) and a timing rotor 8 are fixed, a casing 13 holding a generator 12 consisting of a magnet and a pick-up coil, etc. An ignition signal, generated in the generator 12 in response to the rotation of the timing rotor 8, is elevated in an ignitor, ignition coil, etc. (not shown) up to a predetermined ignition voltage before being input to a carbon contact 14; and a spark discharge which takes place between the rotor arm 7 and one of side poles 9 will supply the ignition voltage to each of the ignition plugs. The above-mentioned driving shaft 1 is, at the lower end thereof (not shown), operatively connected to a cam-shaft of an engine 3 for being able to rotate synchronously with the rotation of the engine. The casing 13 is secured to the engine 3, at the engine block or the cylinder head, by way of being fitted, at a cylindrical portion 2 of the casing 13 through which the driving shaft 1 is pierced, and being seated on the top face of the engine 3 at a flange 5 formed in the middle part of the cylindrical portion 2.

In the flange 5 an elongated hole 18 of arcuate shape with its center at the driving shaft 1, is formed as shown in FIGS. 2 and 3; and the flange 5 is secured to the engine 3 with a bolt 15 pierced through this elongated hole 18. This bolt 15 is pierced at the shank 17 thereof through the elongated hole 18 and covered at the head 16 thereof by a pair of metallic covers, consisting of a first cover 20 and a second cover 30.

The first cover 20 is a container-like member, as shown in FIGS. 4 (a)-(c), composed of a bottom plate 21 of circular shape having a considerably larger diameter than that of the bolt head 16 and a side wall 22 having a slightly larger height than that of the bolt head 16. In the central portion of the bottom plate 21 a through-hole 23 for being pierced by the shank 17 of the bolt 15 is formed; and in the side wall 22 a pair of mutually faced engaging tongues 25 directed to the bottom plate 21 at the tip thereof are formed in the middle portion in the direction of the height of the side wall 22. This pair of engaging tongues 25 are formed by cutting, three sides leaving one side uncut, a part of the side wall 22 in a U-shape, and bending the portion surrounded by the cut sides inwardly to let the tip of the bent portion protrude inside of the inner surface of the side wall 22 of the first cover 20.

The second cover 30 is also a container-like member, as shown in FIGS. 5 (a)-(c), which is composed of a circular bottom plate 31 having a diameter smaller than that of the first cover 20 and larger than that of the bolt head 16 and a side wall 32 almost as high as the side wall 22 of the first cover 20. In the middle portion in the direction of the height of the side wall 32 two pairs of tongue fitting holes 35, engaging cut-away openings for receiving the engaging tongues 25, of rectangular shape are formed at a mutually faced position at each pair. The width of those tongue fitting holes 35 is slightly larger than that of the engaging tongue 25.

When the distributor 10 is secured to the engine 3, the flange 5 is rotated about the driving shaft 1 such that the timing rotor 8 and the generator 12 come up to a predetermined phase position, the first cover 20 is placed with the opening thereof faced upwards on the flange 5, the shank 17 of the bolt 15 is pierced through the through-hole 23 and the elongated hole 18, which have been adjusted to be registered to each other, the head 16 is screwed up by a well-known box spanner, and the position of the flange 5 is thereby finally fixed.

The next step to be taken is to align the engaging tongues 25 with the tongue fitting holes 35 in their phase before the second cover 30 is fitted with the opening thereof faced downwards, into a clearance C between the side wall 22 of the first cover 20 and the bolt head 16. The engaging tongues 25 are at first resiliently deformed outwardly by the forced entering of the side wall 32 of the second cover 30, but when the second cover 30 is deeply inserted enough to almost reach, at the side wall 32 thereof, the bottom plate 21 of the first cover 20 the engaging tongues 25 are allowed to restore the original position protruded inwardly. Fitting of the engaging tongues 25 into the tongue fitting holes 35 of the second cover 30 allows the both members (20, 30) to become an integral body.

In this state it is very difficult for ordinary car users to loosen or remove the bolt 15, because the clearance between the side wall 32 of the second cover 30 and the side wall 22 of the first cover 20 is too small to allow the users of holding or grasping the second cover 30 from outside, and the engagement of the engaging tongues 25 with the tongue fitting holes 35 does not allow to remove the second cover 30 from the first cover 20.

In the service stations or reparing shops it is, however, sometimes necessitated to loosen the bolt 15 for the checking or reparing of the distributor 10. In such an occasion a specially prepared removing tool 50 shown in FIGS. 6 (a)-(c), is utilized for removing the second over 30. This removing tool 50 is a cylindrical body, with the height larger than that of either of the first cover 20 and second cover 30, and with the inner diameter slightly larger than the outer diameter of the second cover 30 and the outer diameter slightly smaller than the inner diameter of the first cover 20; this removing tool 50 of cylindrical body is provided with a pair of engaging pawls 55 formed by cutting three sides in U-shape leaving one side uncut, before bending the portion surrounded by the three cut sides inwardly. This tool having the engaging pawls 55 with the tip thereof faced upwards in FIG. 6 is inserted between the both side walls (22, 32) resisting the resilient force of the inwardly bent engaging pawls 55.

The insertion of the removing tool 50 between both side walls (22, 32) forces with the lowest end thereof the engaging tongues 25 back into an open space created by the earlier stated cutting, and then allows the engaging pawls 55 of the tool to fit into the tongue fitting holes 35 by the resilient force. It causes an integration of the removing tool 50 and the second cover 30 by releasing the engagement between the first and second covers (20, 30). Lifting up of the removing tool 50 at this situation by grasping the margin portion thereof protruding from between both side walls (21, 22) brings about the second cover 30 together with itself, letting the bolt 15 to be exposed open. After having executed necessary measures such as reparing accompanied by a phase adjustment of the distributor 10, the second cover 30 is attached again in place according to the same order stated before.

Another embodiment of this invention will be described briefly next. In this case a second cover 60 composed of a bottom plate 61 with a diameter slightly larger than that of the bolt head 16 and a side wall 62 is secured on the flange 5 with the opening thereof faced upwards. On the circumferential end portion of the second cover 60 a flange portion 63, a brim bent outwardly as an engaging portion parallel to the bottom plate 61, is formed. A first cover 70 is, on the other hand, composed of a bottom plate 71 with a diameter further larger than that of the bottom plate 61 and a side wall 72. At either mutually faced position of the side wall 72 a pair of engaging tongues 75 are formed directed to the bottom plate 71. The first cover 70 can be made into an integrated body with the second cover 60 through the engagement between the tip of the engaging tongues 75 and the bent portion 63 of the second cover 60.

When the bolt head 16 is covered by the first and second covers (70, 60) of such structure, the relative rotation taking place between the engaging tongues 75 of the first cover 70 and the bent portion 63 of the second cover 60, even when any rotational movement is applied to the first cover 70, prevents the second cover 60 from any rotational force, with a good result of keeping the bolt 16 tightly fixed.

Only utilization of a removing device 100 illustrated in FIG. 8 will be enough if and when removal of the first cover 70 is required by any happening. The removing device 100 is composed of an outer cylindrical body 83 with a bottom portion 81 with a larger diameter than that of the first cover 70 and a side wall 82 of larger height and a shiftable body 85 of substantially solid cylindrical matter fitted in the outer cylindrical body 83. The shiftable body 85 is provided with a threaded-bore or tapped-bore for threadedly receiving the end portion of a bolt 87, whose head portion is supported by the bottom portion 81 of the outer cylindrical body 83, and an axial recess 88 formed on the external surface thereof, into which a pin 89 is fitted. The shiftable body 85 can be reciprocated in the outer cylindrical body 83 by means of rotating the bolt 87. In a groove 91 formed in the diametrical direction in the lower half of the shiftable body 85 a pair of arms 92 are attached with a pin 93, 93 respectively, being rotatable thereabout. This pair of arms 92 are provided with a pawl 94 on the free end thereof, a handling portion 96 so formed in the middle portion thereof as to be protruded outwardly of the outer cylindrical body 83 through an axially cutaway opening 97, and a spring 98 biasing the pair of pawls 94 in a mutually approaching direction.

When the first cover 70 must be removed by means of the removing device 100, the outer cylindrical body 83 is at first placed over the first cover 70. Both arms 92 are then separated from each other due to contact of each cam surface 99 on the end of the pawls 94 to the first cover 70. The pawls 94 are then brought again inwardly due to the action of the spring 98 to engage with cut openings 74 in the first cover 70. By means of raising the shiftable body 85 accompanied by the rising up of the arms 92 the flange 63 of the second cover 60 will be deformed or stretched up by the pawls 94 so as to allow the engaging tongues 75 to pass there. In this way the first cover 70 is removed, and it can be released from the pawls 94 of the removing device 100 by releasing the engagement between the pawls 94 and the openings 74 through a manipulation of the handling portion 96.

The relation between the first cover and the second cover in respect to their size may be inverted to that shown in the above-mentioned embodiments. When the size relation between the two is inverted the projecting direction of the engaging tongues 25 and 75 must be inverted to that direction shown in FIG. 3 and FIG. 7.

In the previous embodiments the engaging tongues 25 and 75 are respectively formed integrally with the first cover 20 and 70. They may be however made separately from a first cover 120 and 170, as respectively shown in FIGS. 9 and 10, as a piece of leaf spring respectively for being fixed to the first cover 120 and 170 by means of spot welding, revetting and other securing means, so as to become an engaging piece 125 and 175. In this case the rest part is entirely identical to the previous embodiments, detailed description being omitted here only by allotting the parts in the drawings numerals which are made by adding hundred to the original numerals. Special merits in this case resides in that the covers need not be made of a specially elastic material and either the cover itself and the engaging piece are allowed to respectively have a suitable thickness according to the purpose.

The engaging tongues may be, contrary to the above-mentioned embodiments, projected outwardly of the cover instead of being inwardly directed. It is also permissible, for example, to fix a piece of leaf spring on the outer surface of the side wall of a first cover 260 shown in FIG. 11 to be engaging tongues 265, for being engaged with a circular groove 275 formed on the inner surface of a second cover 270 so as to firmly bind the two members.

It goes without saying that various modifications and variations are possible within the spirit and scope of this invention, for example, type shape, number, size, location, etc., of the engaging tongues may be appropriately selected according to the counter engaging portions which are also variable in many ways in respect to type, size, location, etc., such as being holes, flanges, annular grooves, recesses, and so on. Both may be mutually variable according to the mutual suitable combination.

What is claimed as new and desired to be secured by Letters Patent of the United States is:

1. In a distributor for an internal combustion engine, a device including a tool for enclosing a head of a fixing bolt tightened at a selected position to hold a distributor flange in place, and engageable with said tool for providing access to said head, wherein said device comprises:

an outer cup member including a side wall, a first open end portion and a first substantially closed end portion including a bottom wall having a central bolt hole formed therethrough and fixed to said flange by said fixing bolt inserted through said bolt hole, said side wall having at least a first and second circumferentially spaced elastically yieldable tongue protruding inwardly toward said closed end; and an inverted inner cut member including a side wall, a second open end portion and a second closed end portion, and received within said outer cup member with said second closed end portion located adjacent a side portion of said first open end portion of said outer cup member such that said inner cup member encases therein said head of said fixing bolt, said side wall of said inner cup member having at least one tongue-mating portion engaging each of said first and second tongue upon said inner cup member being forced into said outer cup member such that an outer surface of said side wall of said inner cup member and an inner surface of said side wall of said outer cup member define an annular clearance therebetween selected so as to permit engagement of said first and second tongue with said tongue-mating portion through elasticity of said tongue-mating portion, said annular clearance accommodating an annular portion of said tool adapted to release said engagement and remove said inner cup member by forcing said annular portion into said annular clearance, wherein said inner cup member upon being locked to said outer cup member through said engagement forms a detent-type bolt-head enclosure, such that access to said head is normally prevented unless said inner cup member is removed with said tool.

2. In a distributor for an internal combustion enginer, a separable, locking-type, bolt-head protective device for preventing an unauthorized access to a head of a fixing bolt tightened at a selected position to hold a distributor flange in place, which comprises:

a detent-type enclosure including a fastened outer cup member and an inverted inner cup member, said outer cup member including a first side wall, a first open end portion and a first substantially closed end portion including a bottom wall having a central bolt hole formed therethrough and fixed to said flange by said fixing bolt inserted through said bolt hole, said first side wall having at least a first and second circumferentially spaced elastically yieldable tongue protruding inwardly toward said first closed end, said inverted inner cup member including a second side wall, a second open end and a second closed end and received within said fastened outer cup member with said first closed end located adjacent a side of said second open end of said outer cup member such that said inner cup member encases therein said head of said fixing bolt, said second side wall of said inner cup member having at least one tongue-mating portion formed therein for engaging said first and second tongue upon said inner cup member being forced into said outer cup member, an outer surface of said second side wall of said inner cup member and an inner surface of said first side wall of said outer cup member defining an annular clearance therebetween defined so as to permit engagement of said first and second elastically yieldable tongue with said tongue-mating portion for locking said inner cup member to said fastened outer cup member; and disassembling means for removing said inverted inner cup member locked to said fastened outer cup member, wherein said disassembly means further comprises an annular portion having a height greater than that of said inner cup member and forced into said annular clearnace, wherein said annular portion further comprises at least one elastically yieldable pawl which inwardly protrudes such that, upon insertion of said annular portion into said annular clearance, said annular portion first forces said first and second elastically yieldable tongue from said tongue-mating portion and then said elastically yieldable pawl elastically engages said tongue-mating portion in place of said first and second tongue, such that said locked inner cup member is removed from said fastened outer cup member by removing said disassembling means and such that access to said head of said fixing bolt is obtainable only upon use of said disassembling means.

3. In an internal combustion engine, an apparatus including a pivotable member which is pivotably supported by a body to which the apparatus is fixed and has an elongated hole through which a fastener is inserted to fix the apparatus to the body at a selected angular position along the elongated hole with respect to a pivoting axis of the pivotable member, a separable, locking-type, fastener protective device preventing unauthorized access to a manipulating path of said fastener tightened at said selected position to hold said apparatus in its best operating condition, which comprises:

a detent-type enclosure including a fastened outer cup member and an open end, and a substantially closed end including a bottom wall which has a central fastener hole therethrough and which is fixed to said pivotable member by said fastener inserted through said fastener hole, said side wall having at least a first and second circumferentially spaced elastically yieldable tongue protruding inwardly toward said closed end, said inverted inner cup member including a side wall, an open end and a closed end and received within said fastened outer cup member with said closed end thereof located on the side of said open end of said outer cup member such that said inner cup member encases therein said manipulating part of the fastener, said side wall of said inner cup member having at least one tongue-mating portion engaging said first and second tongue once said inner cup member is forced into said outer cup member, an outer surface of said side wall of the inner cup member and an inner surface of said side wall of the outer cup member defining an annular clearance therebetween whose thickness is selected so as to permit engagement of said tongues with said tongue-mating portion through elasticity of the former for locking said inner cup member to said fastened outer cup member; and enclosure disassembling means for removing said inverted inner cup member locked to said fastened outer cup member, wherein said enclosure disassembling means further comprises an annular portion having a height greater than that of said inner cup member and forced ino said annular clearance, said annular portion having at least one elastically yieldable pawl which inwardly protrudes such that, upon insertion of said annular portion into said annular clearance, said annular portion first forces said first and second tongue against elasticity of the latter away from said tongue-mating portion through elasticity thereof in place of said first and second tongue, whereby said locked inner cup member is removed out of said fastened outer cup member by said pawl by removing the inserted enclosure disassembly means such that access to said manipulating portion of said fastener is obtainable only when said disassembly means is used.

4. A device as recited in claim 1 or 2, wherein each of said first and second elastically yieldable tongue further comprises an integral part of said side wall of said outer cup member wherein said first and second tongue are formed by cutting a profile of said first and second elastically yieldable tongue in said side wall except said integral part thereof and bending said profile, at said integral part, inwardly toward said first substantially closed end.

5. A device as recited in claim 1 or 2, wherein said first and second elastically yieldable tongue further comprises a first and second radially facing rectangular tongue.

6. A device recited in claim 1 or 2, wherein said at least one tongue-mating portion further comprises at least one opening formed through said side wall of said inner cup member.

7. A device as recited in claim 6, wherein said at least one opening further comprises a pair of openings circumferentially spaced so as to radially face each other.

8. A device as recited in claim 2, wherein said at least one elastically yieldable pawl further comprises a pair of pawls circumferentially spaced so as to radially face each other, and said at least one tongue-mating portion further comprises a pair of openings circumferentially spaced so as to radially face each other, said openings being formed through said side wall of said inner cup member.

9. A device as recited in claim 1 or 2, wherein an underside portion of said head of said fixing bolt is contiguous with an inner surface of said bottom wall of said outer cup member.

10. A fixing device in accordance with claim 1, wherein said engaging tongues are pieces of leaf spring separately made from the side wall of said first container-like member for being afterwards fixed thereto.

11. A fixing device in accordance with claim 1, wherein said engaging portion is a flange formed on the end portion of the side wall of said second container-like member.

12. A fixing device in accordance with claim 1, wherein said engaging portion is an annular groove formed circumferentially on the side wall of said second container-like member.

13. A fixing device in accordance with claim 1, wherein said second container-like member is fixed with said bolt on said flange, said first container-like member is fitted on outside said second container-like member, and said engaging tongues are protruded inwardly from the side wall of said first container-like member.

14. A fixing device in accordance with claim 1, wherein said first container-like member is fixed with said bolt on said flange, said second container-like member is fitted on outside said first container-like member, and said engaging tongues are protruded outwardly from the side wall of said first container-like member.

15. A fixing device in accordance with claim 1, wherein said second container-like member is fixed with said bolt on said flange, said first container-like member is fitted into inside said second container-like member, and said engaging tongues are protruded outwardly from the side wall of said first container-like member.

* * * * *